United States Patent [19]

Iwane

[11] Patent Number: 5,073,901

[45] Date of Patent: Dec. 17, 1991

[54] METHOD FOR CORRECTING WAVEFORM DATA IN DIGITAL SIGNAL MODULATION AND BASE BAND SIGNAL GENERATOR USING DATA PROVIDED BY THIS METHOD

[75] Inventor: Yasushi Iwane, Hyogo, Japan

[73] Assignee: Mitsubishi Denki Kabushiki Kaisha, Tokyo, Japan

[21] Appl. No.: 555,703

[22] Filed: Jul. 23, 1990

[30] Foreign Application Priority Data

Aug. 10, 1989 [JP] Japan .................................. 1-207349

[51] Int. Cl.$^5$ ............................................ H04B 14/04
[52] U.S. Cl. ...................................... 375/26; 375/34; 375/58; 375/99
[58] Field of Search ...................... 375/26, 99, 58, 34, 375/60; 341/200

[56] References Cited

U.S. PATENT DOCUMENTS

| | | | |
|---|---|---|---|
| 4,736,387 | 4/1988 | Tzou | 375/26 |
| 4,922,508 | 5/1990 | Moriya | 375/34 |

*Primary Examiner*—Douglas W. Olms
*Assistant Examiner*—Ralph Smith
*Attorney, Agent, or Firm*—Rothwell, Figg, Ernst & Kurz

[57] ABSTRACT

A method for correcting quantized waveform data which are formed by quantizing a baseband waveform, so optimized as to make a sum of errors included in a single bit internal of input digital data smaller than one quantization step, and are output as the baseband waveform which is to be accumulated or integrated in the requirement of the system (such as frequency-to-phase conversion). Since an accumulated sum of the quantized waveform data has some deriation from the real baseband waveform when those quantized waveform data are accumulated so as to generate phase information from frequency information, the quantized waveform data have to be corrected previously. For the purpose of reducing the accumulated error, this method involves the steps of defining states corresponding to input data patterns, establishing simultaneous equations corresponding to state transition routes respectively, solving the equations, and deciding correcting values for the quantized data.

6 Claims, 5 Drawing Sheets

FIG. 3 (PRIOR RAT)

METHOD FOR CORRECTING WAVEFORM DATA IN DIGITAL SIGNAL MODULATION AND BASE BAND SIGNAL GENERATOR USING DATA PROVIDED BY THIS METHOD

BACKGROUND OF THE INVENTION

1. Field of the Invention

The present invention relates to a method for correcting waveform data in digital signal modulation and, more particularly, to a method for correcting waveform data stored in a baseband generator of a digital modulator so as to reduce an accumulated error (The method is hereinafter referred to as the waveform data correction method.), and a baseband signal generator using data provided by the method.

2. Description of the Prior Art

FIG. 1 is a block diagram showing a baseband waveform generator in a quadrature modulation type digital FM modulator. In the figure, numeral 1 is a shift register (an element that can accommodate consecutive data) for storing a serial binary digital signal (input data). Numeral 2 is a waveform memory for storing waveform data obtained by quantizing a baseband waveform and outputting a waveform similar to the baseband waveform. Numeral 3 is a counter for counting a clock signal. Numeral 4 is an adder for adding the waveform data output from the waveform memory 2 to the output data from a latch circuit 5. The latch circuit 5 latches the output data from the adder 4 and supplies the data back to the adder 4. The adder 4 and the latch circuit 5 constitute an integrator that add up consecutively the waveform data coming out of the waveform memory 2. Numeral 6a is a COS-ROM for converting the output data from the adder 4 into an I signal (in-phase signal). Numeral 6b is a SIN-ROM for converting the output data from the adder 4 into a Q signal (quadrature-phase signal). Numerals 7a and 7b are D-A converters for converting the I signal and the Q signal into analog waveforms, respectively. Numerals 8a and 8b are low-pass filters (LPF) for shaping a waveform output from the respective D-A converters. Numerals 9a and 9b are respectively an I output and a Q output, being fed to the quadrature modulator (not shown in this figure).

In the setup described above, the waveform memory 2 stores a quantized baseband waveform as waveform data. As such, the waveform data contains a quantization error. As the waveform data from the waveform memory 2 are added up by the adder 4, the quantization errors involved are accumulated. To eliminate the accumulated quantization errors requires suitable arrangements for error correction. There is known a method in which the waveform data stored in the waveform memory 2 are previously corrected. FIG. 3 is a flowchart showing how this kind of correction is done.

What follows is a description of how the baseband generator works and how the waveform data is corrected thereby. First, the operation of the baseband generator is explained. Where the modulation process involves the so-called intersymbol interference, input data is stored in the shift register 1. A baseband waveform corresponding to all the patterns of the data stored in the shift register 1 is stored in the waveform memory 2 as quantized values obtained by sampling the baseband waveform at a rate of n times the bit rate. Thus a clock signal generated at the rate of n times the bit rate is counted by the n-based counter 3. Every time a counted value reaches n, the shift register 1 shifts the input data. The waveform memory 2 is arranged to output waveform data every time the counter 3 counts one clock pulse. The waveform data from the waveform memory 2 are added up consecutively, i.e., integrated, by the adder 4 and the latch circuit 5. In this manner, frequency information is converted to phase information. The phase information thus obtained is converted by the COS-ROM 6a and the SIN-ROM 6b into the I signal and Q signal for quadrature modulation. The two signals are then converted to analog signals by the D-A converters 7a and 7b. After waveform shaping by the LPF's 8a and 8b, the I output 9a and the Q output 9b are output as analog signals to a quadrature modulator.

FIG. 2 illustrates a typical relationship between a baseband waveform 10 and waveform data 11b. The waveform memory 2 outputs a quantized baseband waveform 11a corresponding to the baseband waveform 10. That is, the waveform data 11b is stored at an address in memory 2 specified by the value in the shift register 1 and by the value in the counter 3. In FIG. 2, it is assumed that sixteen items of waveform data 11b correspond to a single bit interval of input data 11c (i.e., n=16). In this case, the value obtained by the adder 4 adding up the sixteen items of waveform data 11b is so optimized as to fall within the width of one quantization step with respect to the value obtained by adding the sixteen sampled values. That is, sixteen items of waveform data 11b in a single bit interval of input data are arranged so that the added value of waveform data 11b keyed to the single bit interval has its error fall within one quantized step with respect to the baseband waveform. For example, adding up the sixteen items of waveform data 11b in FIG. 2 provides a value of 89. This value includes a quantization error with respect to the baseband waveform 10 which is within one quantization step.

As described above, as far as waveform data 11c in a single bit interval is concerned, it is relatively easy not to let the accumulated error from additions exceed the quantization step width. When waveform data 11c of multiple bit intervals is consecutively added, there is a possibility that the accumulated error may exceed the quantization step width. To eliminate the error simply requires correcting a number of waveform data items.

FIG. 3 is a flowchart outlining the conventional error correction method. In step ST30, a state transition diagram is prepared. FIG. 4 is a state transition diagram in effect where the shift register 1 has three shift stages. In FIG. 4, there exist eight states according to the bit patterns in the shift register 1. In this figure, the value in parentheses to the right of Jn (n=0-7) indicates an accumulated error of waveform data in one bit range in which a value of 1.0 is equal to a quantization step width. In a state J0, it is shown that to input "1" to the shift register 1 causes transition to a state J1. Now a case is assumed in which a loop is formed by starting from the state J0 and returning to that state through any route. This is step ST31 in FIG. 3. For example, a route $$J0 \rightarrow J1 \rightarrow J2 \rightarrow J4 \rightarrow J0$$

may be taken. As to this route, errors included in the waveform data 11c of one bit range are accumulated. The resulting accumulated value is 1.05, which exceeds the quantization step width (1.0=quantization step width). So each of the states along the above-described route is tagged with a note saying "accumulated error present" (steps ST32 and ST33). Then another typical route $$J0 \rightarrow J1 \rightarrow J3 \rightarrow J6 \rightarrow J4 \rightarrow J0$$

may be taken. In this case, the accumulated value of errors is 0.0, which does not exceed the quantization step width. So each of the states along the route is tagged with a note saying "no correction needed" (step ST34). The process from step ST31 to step ST34 is repeated until every branch (a branch is a path that connects two states) is passed at least once. Whether every branch is passed at least once or not is judged in step ST35.

When every branch has been passed at least once, there may remain states with a note "accumulated error present" attached thereto. In the example above, states J2 and J5 remain noted for having an accumulated error each. In Step ST36, the states to be corrected are suitably selected to correct the waveform data 11c corresponding to these states. Then each route whose accumulated value of errors exceeds the quantization step width is checked again. Steps ST36 and ST37 are repeated until the accumulated error value falls within the quantization step width. A three-stage shift register has been used in the example above for the purpose of explanation. In practice, the number of stages of the shift register may be much larger because of the need to consider the degree of inters interference. The number of states involved is $2^M$ where M is the number of stages. This poses quite a challenge in verifying all the branches involved.

Since waveform data has been conventionally corrected as described above, there are no definite criteria for making the correction in step ST36 of FIG. 3. Errors can only be minimized through the trial and error approach. Also, there are no criteria for selecting a route in step ST31. This has made it necessary for redundant routes to be selected many times before every branch has been passed at least once.

SUMMARY OF THE INVENTION

The above problems are those that the present invention proposes to solve. A waveform data correction method according to the invention can correct waveform data logically. Also, the method can verify all the branches efficiently without omission.

In a waveform data correction method according to the present invention, an element such as a shift register or like element that can make accommodate to sequential data of a predetermined number of bits stored therein, is used (this element is hereinafter referred to as a shift register). When waveform data which is used for generating a baseband waveform based on the digital data stored in the shift register, is accumulated for modulation, errors deviating from the baseband waveform are accumulated. The accumulated errors are suitably reduced by the method of the present invention to fall within a predetermined range. At the beginning of the correction process, it is necessary to define $2^M$ states (M = number of stages of shift register) that correspond to the bit patterns of the data stored in the shift register. Each state is keyed to a single bit interval of digital data as waveform data. The initial state is a state that corresponds to a bit pattern in effect when the M bits are all zeros. (Alternatively, the initial state can be a state corresponding to the bit pattern in effect when the M bits are all ones.) Data comprised of odd numbers in binary format from 1 to $2^M - 1$ (or data in inverted binary format) is followed by the bit pattern keyed to the initial state (i.e., a pattern of a series of M bits of either all zeros or all ones). The data and the bit pattern are regarded collectively as a data pattern. State transition according to each of the generated data patterns forms a route. On each route, errors contained in the waveform data in each state are added up. When the result of the error accumulation has exceeded a predetermined level of a quantization step, an equation $$\Sigma S_k = -(accumulated\ error)$$

is formed, where $S_k$ represents a correction value for the waveform data of the state k included in the target route (k corresponds to the state number). After the accumulated errors are calculated for every route, the resulting simultaneous equations for all $S_k$ values are solved. The error correction value for a specific $S_k$ is thus determined for waveform data correction.

In the step of generating the data pattern in an embodiment of the present invention, all routes covering all the state transitions can be determined efficiently. In the step of solving the above-mentioned simultaneous equations, it is possible to determine logically the correction value for any candidate waveform data to be corrected.

DETAILED DESCRIPTION OF THE PREFERRED EMBODIMENTS

Figure 1:
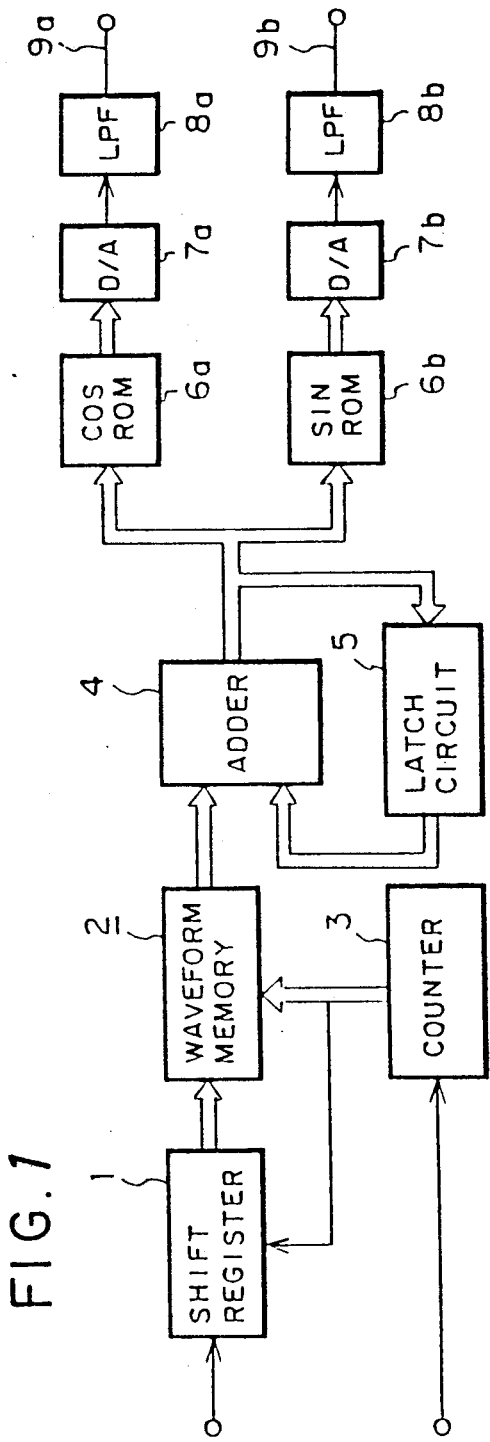
FIG. 1 is a block diagram illustrating a baseband generator of a quadrature modulation type digital FM modulator.
Figure 2:
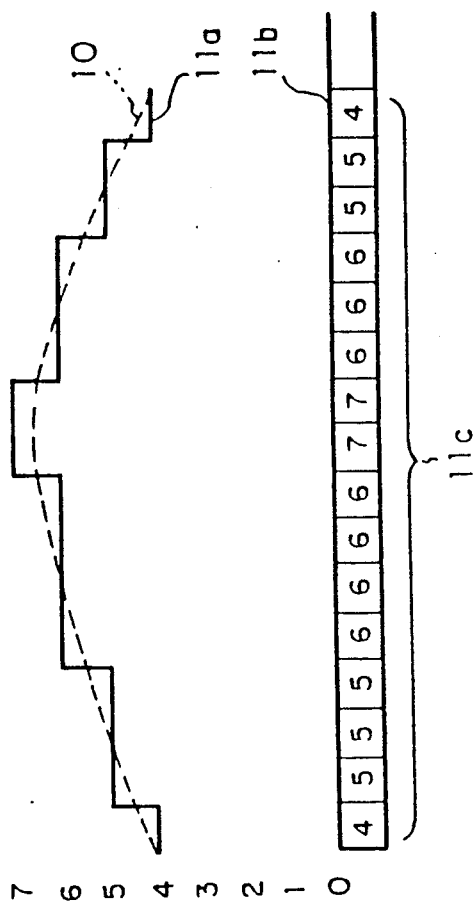
FIG. 2 is a view typically showing waveform data during a single bit interval of input digital data prior to correction.
Figure 3:
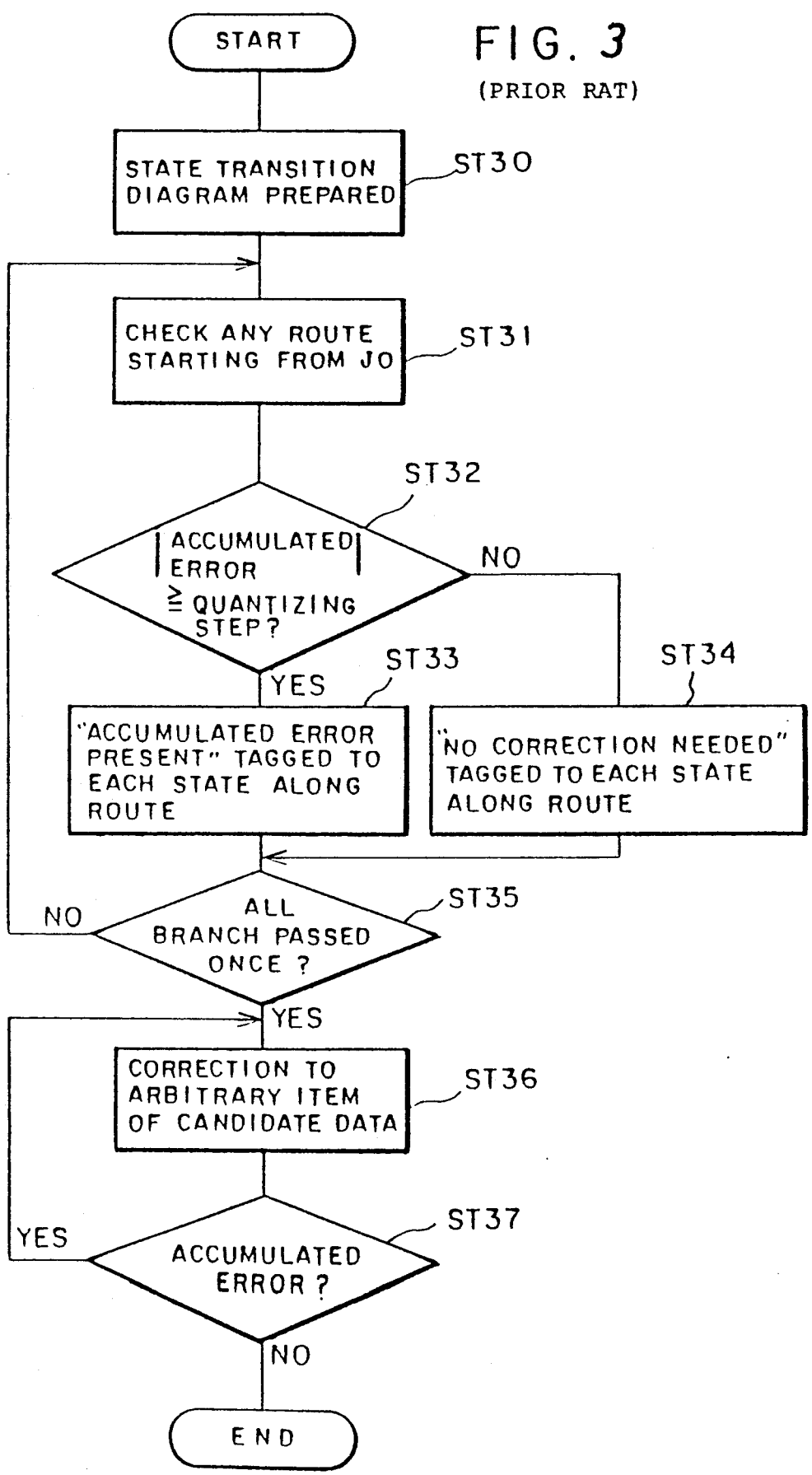
FIG. 3 is a flowchart showing a conventional waveform data correction method.
Figure 5:
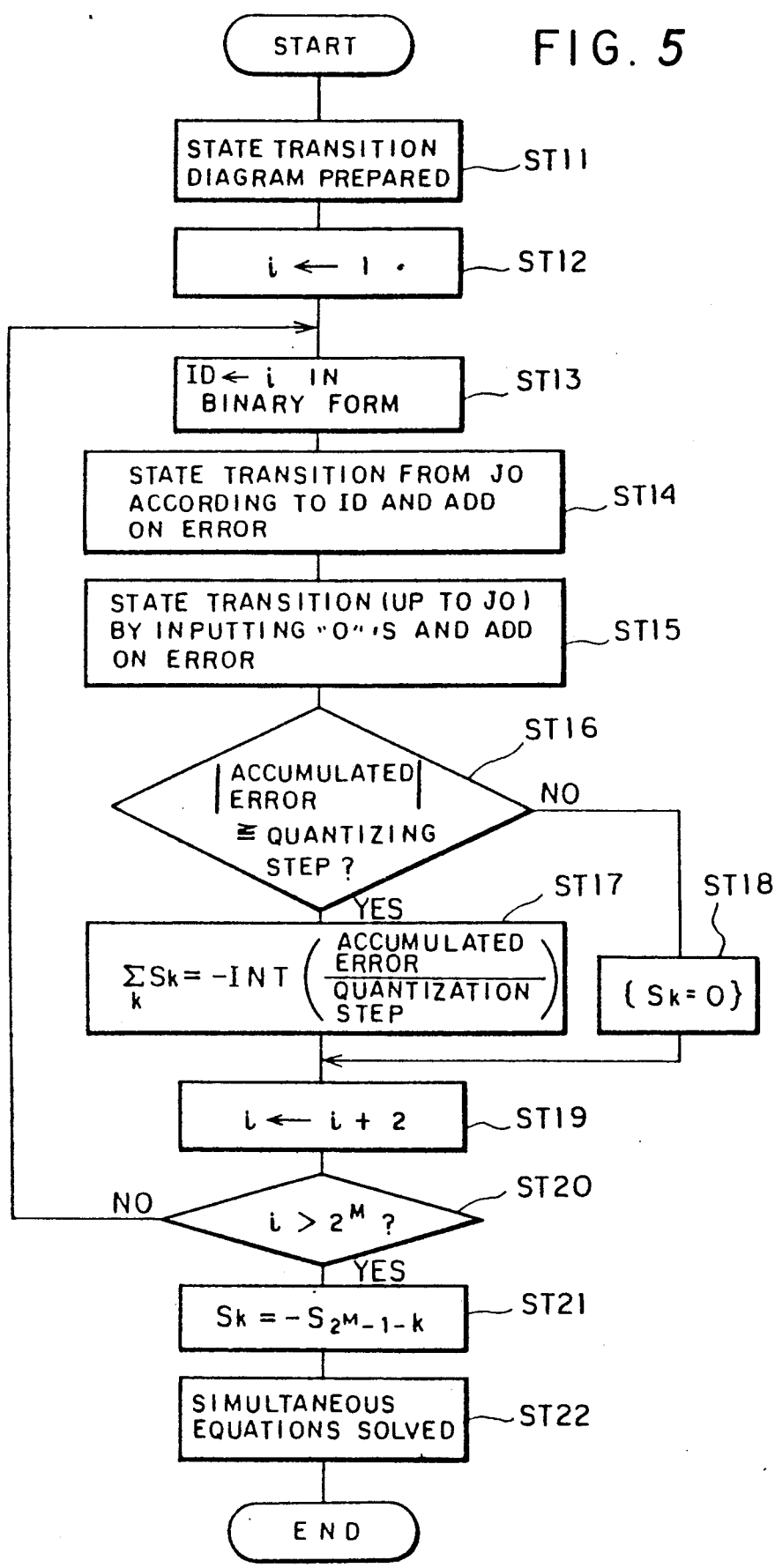
FIG. 5 is a flowchart showing how waveform data modulated by GMSK (Gaussian Minimum Shift Keying) is corrected in an embodiment of the present invention.

A preferred embodiment of the present invention will now be explained by referring to the accompanying drawings. FIG. 5 is a flowchart showing how a correction value is obtained. Waveform data 11c has an error from a baseband waveform not exceeding a quantization step width in a single bit interval of digital data. A route is formed by starting from state J0 (corresponding to a state where each stage of the shift register in FIG. 1 is zero) and by returning to that state. Along this route, errors in the waveform data 11c are accumulated; the accumulated error is to be corrected by using a value obtained by the steps in this chart.

The operations depicted in FIG. 5 are now explained. In step ST11, a state transition diagram is prepared in the same manner as before. Then the value of a counter i is initialized to 1 in step ST12. The value of the counter i is indicated in binary form in step ST13. This binary value is regarded as a data pattern. Transition begins from state J0 and proceeds to subsequent states as determined by the data pattern. Every time a state is passed, the error of the waveform data corresponding to that state is accumulated. After the route determined by the data pattern has been followed, transition is allowed to continue by assuming that zero bits are input successively until returning to state J0. The error contained in the waveform data 11c keyed to each state passed is further accumulated, in step ST14 and ST15. If the accumulated error has exceeded the quantization step width, a correction equation $$\sum_k S_k = -\text{INT}(\text{accumulated error/quantization step width})$$

is formed, in step ST17, where $S_k$ (k=a state number) represents a correction value for the waveform data 11c. Here, $\Sigma$ is the sum of the errors of all k states corresponding to all states passed. INT(x) means the integer part of x. On the other hand, if the accumulated error is not in excess of the quantization step width, another equation, $$\{S_k = 0\}$$

is formed in step ST18. Here, k corresponds to each state passed in step ST14 and ST15.

Figure 4:
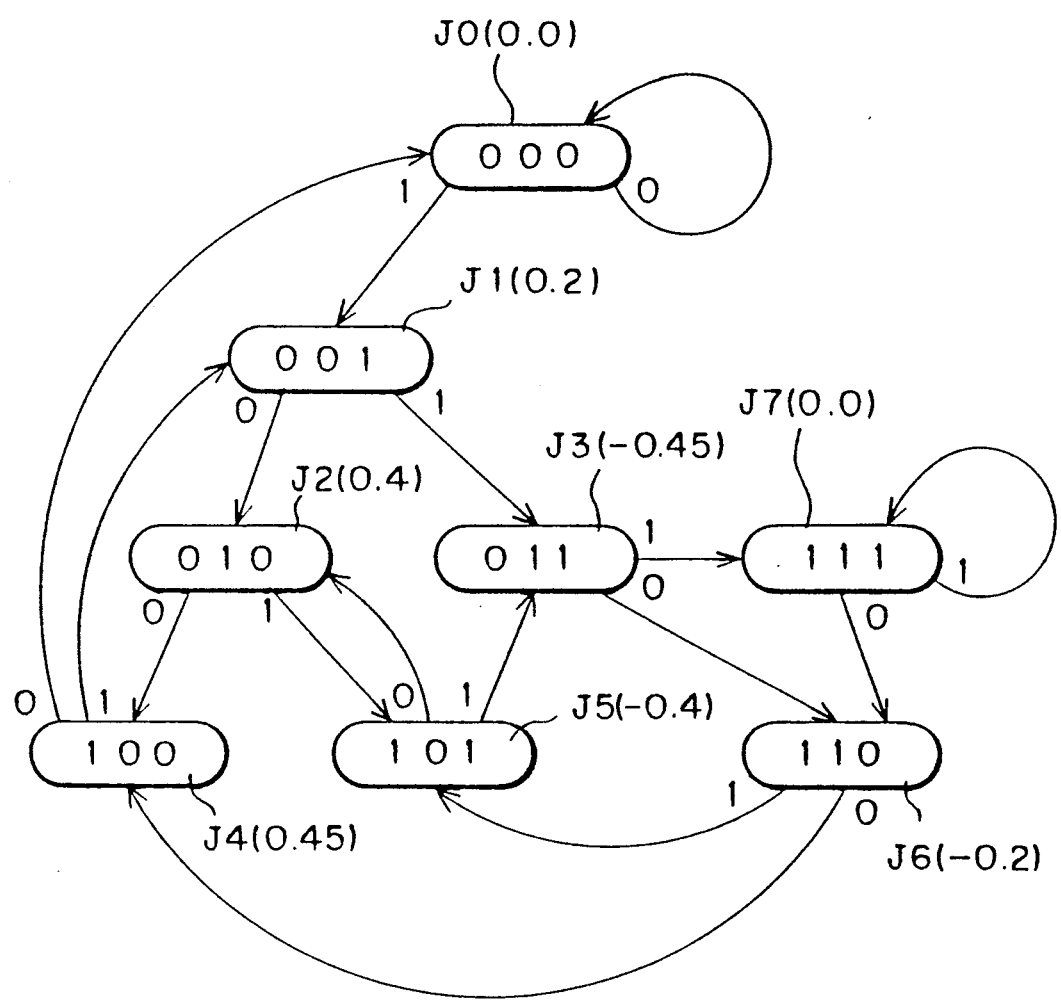
FIG. 4 is a state transition diagram for the case where the shift register 1 depicted in FIG. 3 is of a three-stage type (M = 3)

Referring now to the state transition diagram in FIG. 4, steps ST12 through ST15 represent the route of state transition of $$J0 \to (1) \to J1 \to (0) \to J2 \to (0) \to J4 \to (0) \to J0$$

The accumulated error on the route is $$0.0 + 0.2 + 0.4 + 0.45 = 1.05$$

Since INT(1.05)=1, a correction equation of $$S_0 + S_1 + S_2 + S_4 = -1 \tag{1}$$

is obtained.

In step ST19, two is added to the value of the counter i. Steps ST13 through ST18 are repeated until immediately before the value of the counter i exceeds $2^M$ (M=the number of stages of shift register). In the process described above, every time step ST14 is carried out, a data pattern of "1" (i=1), "11" (i=3), "101" (i=5), "111" (i=7), ..., and "11...1" (i=$2^M - 1$)

is handled. Where the so-called GMSK (Gaussia filtered Minimum Shift Keying) is adopted as the modulation method, all the states in the state transition diagram and three-fourths of the branches involved can be covered because of these data pattern inputs. Considering the symmetry of state transition under the GMSK method, it can be said that all branches are in fact covered.

In this manner, the routes passing all branches are verified mechanically. In the example shown in FIG. 4, when the value of the counter i is three, a data pattern of "11" is handled. That is, the state transition takes place as $$J0 \to J1 \to J3 \to J6 \to J4 \to J0$$

The accumulated error is $$0.0 + 0.2 + (-0.45) + (-0.2) + 0.45 = 0.0$$

Therefore, a correction equation of $$S_0 = S_1 = S_3 = S_6 = S_4 = 0 \tag{2}$$

is obtained. Similarly, when the value of the counter i is five, a correction equation of $$S_0 + S_1 + S_2 + S_5 + S_2 + S_4 = -1 \tag{3}$$

is obtained. When the value of the counter i is seven, a correction equation of $$S_0 = S_1 = S_3 = S_7 = S_6 = S_4 = 0 \tag{4}$$

is obtained.

Under the GMSK method, the symmetry of filter response translates into the symmetry of state transition and the symmetry of error configuration. This characteristic is used, in step ST21, to eliminate variables. That is, the characteristic represented by an expression (5), shown below, is utilized.

$$S_k = -S_{2^M - 1 - k} \tag{5}$$

where, $k = 2^{M-1}, \ldots, 2^M - 1$

When M=3 (in the case of FIG. 4), an expression (5) becomes $$S_k = -S_{7-k} \tag{6}$$

where, k=4, 5, 6, 7

By applying the expression (6) to the expressions (1) through (4), simultaneous equations of $$S_0 + S_1 + S_2 - S_3 = -1 \tag{11}$$

$$S_0 = S_1 = S_3 = 0 \tag{21}$$

$$S_0 + S_1 + S_2 - S_3 = -1 \tag{31}$$

are obtained. When these equations are solved in step ST22, the correction value for the waveform data 11c corresponding to each state is obtained. For waveform data correction, the correction value is assigned to any appropriate item of the waveform data 11b contained among the waveform data 11c of a single bit interval.

In the embodiment described above, the route that starts from state J0 and returns to that state has been selected for verification of all routes. It is also possible to select a route that starts from a state J($2^M - 1$) and returns to the same state. In the latter case, all bits of $I_D$ (the value i in binary format) obtained in step ST13 are inverted to form a data pattern. Using that data pattern, '1' bits may be kept being input during state transition until the state J($2^M - 1$) is reached again in step ST15.

In the above-described embodiment, the GMSK method has been adopted as the modulation method. The modulation method may also be TFM (Tamed Frequency Modulation) or other versions of digital frequency modulation. Where the present invention is embodied, these arrangements also prove as effective as the GMSK method. But it is required that both routes starting from J0 state and starting from J($2^M - 1$) state are selected unless the modulation method used has symmetry of filter response.

The invention may also be applied to the correction of waveform data where another baseband generator equivalent to that shown in FIG. 1 is used for modulation.

Figure 6:
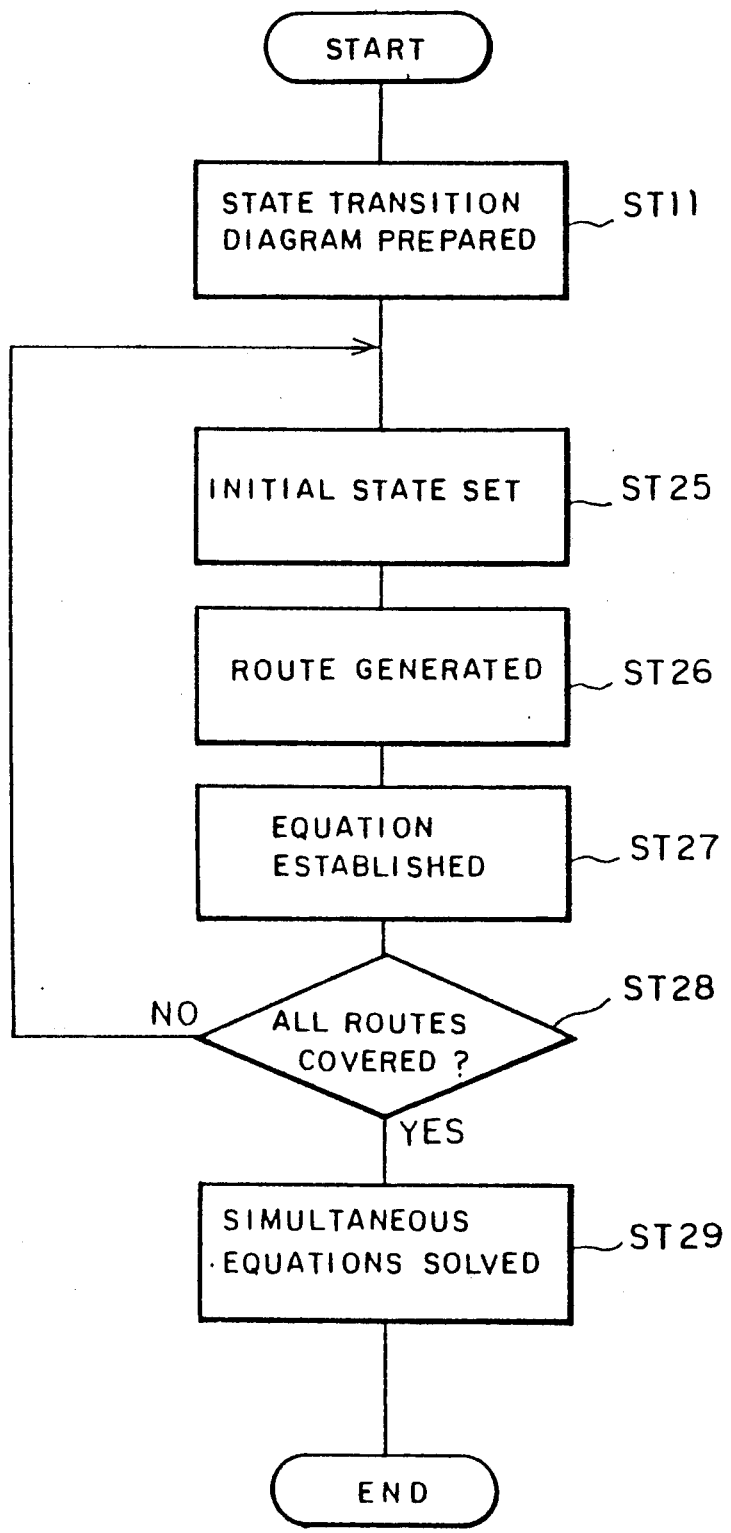
FIG. 6 is a flowchart depicting a generalized algorithm for eliminating accumulated errors in another embodiment according to the present invention.

In addition to digital modulation applications the method of correcting accumulated errors according to the present invention has a wide range of applications in which additions are carried out according to a given state transition diagram. FIG. 6 is a flowchart generalizing the flowchart of FIG. 5. In this generalized setup, state transition is allowed to start from any of the states in the state transition diagram in step ST25, and to return to the same state, in step ST26, to form a route. All the patterns that constitute such a route are mechanically generated in this step. State transition takes place according to each pattern generated so as to obtain equations in step ST27. When the processing is completed on all patterns in step ST28, the resulting simultaneous equations are solved in step ST29.

Those corrected waveform data as described above are stored in the waveform memory 2 in FIG. 1. A baseband signal generator having corrected waveform data performs in the same manner as a conventional generator. But the designer of a modulation system can design the data in the waveform memory 2 more quickly and logically as compared to conventional designing.

As described above, the waveform data correction method according to the present invention makes i possible to determine mechanically the routes such as to cover all branches of the state transitions involved. The method then allows simultaneous equations to be formed corresponding to these routes. By solving these equations, it is possible to determine the waveform data to be corrected and the corresponding correction value. This method ensures the verification of accumulated errors in waveform data in any applications where the waveform data is added up consecutively. The method is also reliable and efficient in determining the assignment of correction values to the respective items of waveform data.

What is claimed is:

1. A method for correcting digital signal modulation waveform data which corrects quantized waveform data stored in a waveform memory for generating a baseband waveform according to consecutive M-bit digital data, where number, stored in an element capable of accommodating said consecutive M-bit digital data, so as to reduce an accumulated error in an accumulated value of said quantized waveform data deviating from an accumulated value of said baseband waveform to within a predetermined value, comprising the steps of:

defining states, each of which corresponds to respective bit patterns of said consecutive M-bit digital data stored in said element, which outputs said quantized waveform data of a single bit interval, and defining one of the states as a first initial state corresponding to a bit pattern of all "0" bits and another one of the states as a second initial state corresponding to a bit pattern of all "1" bits;

generating binary data patterns, each of which begins with a respective odd number from one to $(2^M-1)$ followed by a predetermined number of consecutive "0" bits necessary for reaching the bit pattern corresponding to said first initial state by shifting said respective data patterns, or each of which beginning with a complement of an odd number from one to $(2^M-1)$ followed by a predetermined number of consecutive "1" bits necessary for reaching the bit pattern corresponding to said second initial state by shifting said respective data patterns;

computing said accumulated error along each of a number of state transition routes from said first or second initial states set in accordance with each of said data patterns generated above;

establishing simultaneous equations, corresponding to said routes, each left hand side of which is a sum of correction variables for said accumulated error computed along each state transition route, and each right hand side of which is a correction value for said quantized waveform data corresponding to said states existing along said state transition route subjected to computation;

determining states to be corrected concerning said quantized waveform data and the corresponding correction values by solving the simultaneous equations established after computing said accumulated errors along all the set routes; and correcting said quantized waveform data in accordance with said correction values.

2. A method for correcting digital signal modulation waveform data having a symmetrical filter response characteristic which corrects quantized waveform data stored in a waveform memory for generating a baseband waveform according to consecutive M-bit digital data where M is a predetermined positive among input digital number, stored in an element capable of accommodating said consecutive M-bit digital data, so as to reduce an accumulated error in an accumulated value of said baseband waveform within a predetermined value, comprising the steps of:

defining states, each of which corresponds to respective bit patterns of said consecutive M-bit digital data stored in said element, which outputs said quantized waveform data of a single bit interval, and defining one of the states as an initial state corresponding to a bit pattern of all "0" bits;

generating binary data patterns, each of which begins with a respective odd number from one to $(2^M-1)$ followed by a predetermined number of consecutive "0" bits necessary for reaching the bit pattern corresponding to said first initial state by shifting said respective data patterns;

computing said accumulated error along each of a number of state transition routes from said initial state set in accordance with each of said data patterns generated above;

establishing simultaneous equations, corresponding to said routes, each left hand side of which is a sum of correction variables for said accumulated error computed along each state transition route, and each right hand side of which is a correction value for said quantized waveform data corresponding to said states existing along said state transition route subjected to computation;

eliminating some of said variables in the equations because of said symmetrical filter response characteristic;

determining states to be corrected concerning said quantized waveform data and the corresponding correction values by solving the simultaneous equations established after computing said accumulated errors along all the set routes; and correcting said quantized waveform data in accordance with said correction values.

3. A method for correcting digital signal modulation waveform data having a symmetrical filter response characteristic which corrects quantized waveform data stored in a waveform memory for generating a baseband waveform according to consecutive M-bit digital data where M is a predetermined positive among input digital number, stored in an element capable of accommodating said consecutive M-bit digital data, so as to reduce an accumulated error in an accumulated value of said baseband waveform within a predetermined value, comprising the steps of:

defining states, each of which corresponds to respective bit patterns of said consecutive M-bit digital data stored in said element, which outputs said quantized waveform data of a single bit interval, and defining one of the states as an initial state corresponding to a bit pattern of all "0" bits:

generating binary data patterns, each of which begins with a respective complement of an odd number from one to $(2^M-1)$ followed by a predetermined number of consecutive "0" bits necessary for reaching the bit pattern corresponding to said initial state by shifting said respective data patterns;

computing said accumulated error along each of a number of state transition routes from said initial state set in accordance with each of said data patterns generated above;

establishing simultaneous equations, corresponding to said routes, each left hand side of which is a sum of correction variables for said accumulated error computed along each state transition route, and each right hand side of which is a correction value for said quantized waveform data corresponding to said states existing along said state transition route subjected to computation;

eliminating some of said variables in the equations because of said symmetrical filter response characteristic;

determining states to be corrected concerning said quantized waveform data and the corresponding correction values by solving the simultaneous equations established after computing said accumulated errors along all the set routes; and correcting said quantized waveform data in accordance with said correction values.

4. A baseband signal generator in a signal modulation system comprising:

a shift register which shifts input digital data and outputs parallel data;

a counter which counts clock signals generated at a rate of n times a bit rate of said input digital data, and outputs a count value signal to said shift register so as to shift said input data every time the count value reaches n;

a waveform memory which has quantized data formed by quantizing a baseband waveform corresponding to all patterns indicated by said parallel data, and outputs said quantized data as the baseband waveform at a rate of n times the bit rate from addresses pointed to by said parallel data and said count value to an adder connected to the memory; wherein said quantized data stored in said waveform memory; wherein said quantized data stored in said waveform memory are optimized by the steps of defining states, each of which corresponds to respective bit patterns of consecutive M-bit digital data stored in said shift register which outputs said parallel data of a single bit interval, and defining one of the states as a first initial state corresponding to a bit pattern of all "0" bits and another one of the states as a second initial state corresponding to a bit pattern of all "1" bits;

generating binary data patterns, each of which begins with a respective odd number from one to $(2^M-1)$ followed by a predetermined number of consecutive "0" bits necessary for reaching the bit pattern corresponding to said first initial state by shifting said respective data patterns, or each of which beginning with a complement of an odd number from one to $(2^M-1)$ followed by a predetermined number of consecutive "1" bits necessary for reaching the bit pattern corresponding to said second initial state by shifting said respective data patterns;

computing said accumulated error along each state transition routes from said first or second initial states set in accordance with each of said data patterns generated above;

establishing simultaneous equations, corresponding to said routes, each left hand side of which is a sum of correction variables for said accumulated error computed along each state transition route, and each right hand side of which is a correction value for said quantized waveform data corresponding to said states existing along said state transition route subjected to computation;

determining states to be corrected concerning said quantized waveform data and the corresponding correction values by solving the simultaneous equations established after computing said accumulated errors along all the set routes; and correcting said quantized waveform data in accordance with said correction values.

5. A baseband signal generator in a digital signal modulation system having a symmetrical filter response characteristic comprising:

a shift register which shifts input digital data and outputs parallel data;

a counter which counts clock signals generated at a rate of n times a bit rate of said input digital data, and outputs a count value signal to said shift register so as to shift said input data every time the count value reaches n;

a waveform memory which has quantized data formed by quantizing a baseband waveform corresponding to all patterns indicated by said parallel data, and outputs said quantized data as the baseband waveform at a rate of n times the bit rate from addresses pointed to by said parallel data and said count value to an adder connected to the memory; wherein said quantized data stored in said waveform memory; wherein said quantized data stored in said waveform memory are optimized by the steps of defining states, each of which corresponds to respective bit patterns of consecutive M-bit digital data stored in said shift register which outputs said parallel data of a single bit interval, and defining one of the states as an initial state corresponding to a bit pattern of all "0" bits;

generating binary data patterns, each of which begins with a respective odd number from one to $(2^M-1)$ followed by a predetermined number of consecutive "0" bits necessary for reaching the bit pattern corresponding to said first initial state by shifting said respective data patterns, or each of which beginning with a complement of an odd number from one to $(2^M-1)$ followed by a predetermined number of consecutive "1" bits necessary for reaching the bit pattern corresponding to said second initial state by shifting said respective data patterns;

computing said accumulated error along each state transition routes from said first or second initial states set in accordance with each of said data patterns generated above;

establishing simultaneous equations, corresponding to said routes, each left hand side of which is a sum of correction variables for said accumulated error computed along each state transition route, and each right hand side of which is a correction value for said quantized waveform data corresponding to said states existing along said state transition route subjected to computation;

eliminating some of said variables in the equations because of said symmetrical filter response characteristic;

determining states to be corrected concerning said quantized waveform data and the corresponding correction values by solving the simultaneous equations established after computing said accumulated errors along all the set routes; and correcting said quantized waveform data in accordance with said correction values.

6. A baseband signal generator in a digital signal modulation system having a symmetrical filter response characteristic comprising:

a shift register which shifts input digital data and outputs parallel data;

a counter which counts clock signals generated at a rate of n times a bit rate of said input digital data, and outputs a count value signal to said shift register so as to shift said input data every time the count value reaches n;

a waveform memory which has quantized data formed by quantizing a baseband waveform corresponding to all patterns indicated by said parallel data, and outputs said quantized data as the baseband waveform at a rate of n times the bit rate from addresses pointed to by said parallel data and said count value to an adder connected to the memory; wherein said quantized data stored in said waveform memory; wherein said quantized data stored in said waveform memory are optimized by the steps of defining states, each of which corresponds to respective bit patterns of consecutive M-bit digital data stored in said shift register which outputs said parallel data of a single bit interval, and defining one of the states as an initial state corresponding to a bit pattern of all "0" bits;

generating binary data patterns, each of which begins with a respective odd number from one to $(2^M-1)$ followed by a predetermined number of consecutive "0" bits necessary for reaching the bit pattern corresponding to said first initial state by shifting said respective data patterns;

computing said accumulated error along each state transition routes from said first or second initial states set in accordance with each of said data patterns generated above;

establishing simultaneous equations, corresponding to said routes, each left hand side of which is a sum of correction variables for said accumulated error computed along each state transition route, and each right hand side of which is a correction value for said quantized waveform data corresponding to said states existing along said state transition route subjected to computation;

eliminating some of said variables in the equations because of said symmetrical filter response characteristic;

determining states to be corrected concerning said quantized waveform data and the corresponding correction values by solving the simultaneous equations established after computing said accumulated errors along all the set routes; and correcting said quantized waveform data in accordance with said correction values.

* * * * *

UNITED STATES PATENT AND TRADEMARK OFFICE
CERTIFICATE OF CORRECTION

PATENT NO. : 5,073,901

DATED : December 17, 1991

INVENTOR(S) : Yasushi Iwane

It is certified that error appears in the above-identified patent and that said Letters Patent is hereby corrected as shown below:

ON THE COVER PAGE:

[57] IN THE ABSTRACT:
Line 9, "deriation" should be --deviation--.

COLUMN 2:
Line 63, "J0 ∴ J1→J2→J4→J0" should be --J0→J1→J2→J4→J0--.

COLUMN 3:
Line 29, "inters" should be --intersymbol--.

COLUMN 6:
Line 27, "$S_k=-S_2M_{s-1-k}$" should be --$S_k = -S_2 M-1-k$--.

COLUMN 7:
Line 29, "i" should be --it--.
Line 47, insert after "where" --M is a predetermined positive--.

COLUMN 8:
Lines 31 and 32, delete "among input digital".

COLUMN 9:
Lines 8 and 9, delete "among input digital".
Lines 19 and 23, "0" should be --1--.
Lines 65 and 66, delete "wherein said quantized data stored in said waveform memory;".

UNITED STATES PATENT AND TRADEMARK OFFICE
CERTIFICATE OF CORRECTION

PATENT NO. : 5,073,901

DATED : December 17, 1991

INVENTOR(S) : Yasushi Iwane

It is certified that error appears in the above-identified patent and that said Letters Patent is hereby corrected as shown below:

COLUMN 10:
   Lines 57 and 58, delete "wherein said quantized data stored in said waveform memory;".

COLUMN 11:
   Line 4, "patterns" should be --patterns;--.
   Delete lines 5 through 10.
   Line 12, delete "first or second".

COLUMN 12:
   Line 7, delete "form memory;".
   Line 15, "0" should be --1--.
   Line 17, after "respective" insert --complement of an--.
   Line 19, "0" should be --1--.
   Line 20, delete "first".
   Line 22, after "each" insert --of a number of--.
   Line 23, delete "first or second".
   Line 24, "states" should be --state--.

Column 11, line 3, delete "first".

Signed and Sealed this

Eighth Day of August, 1995

Attest:

BRUCE LEHMAN

Attesting Officer     Commissioner of Patents and Trademarks